Patented Apr. 23, 1929.

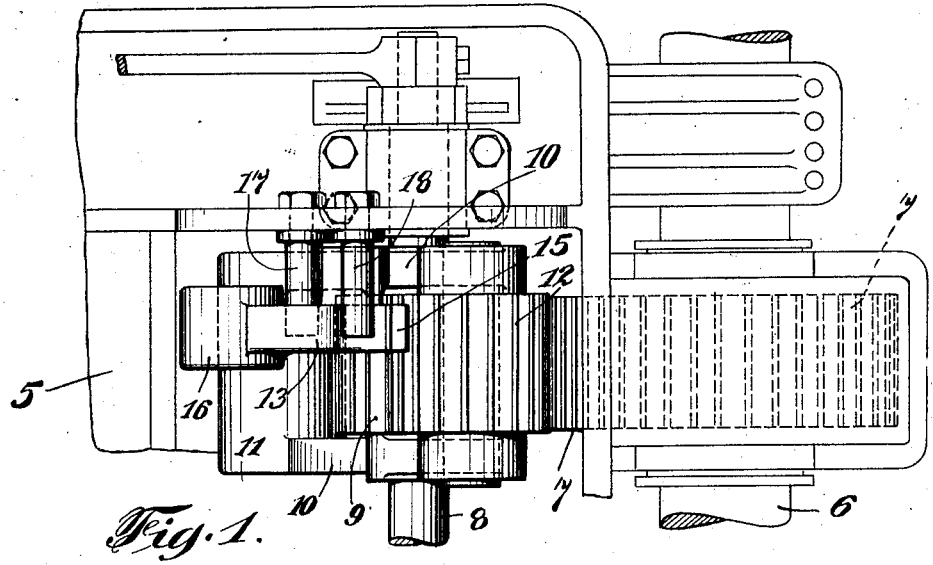

1,710,427

UNITED STATES PATENT OFFICE.

JOHN A. McGREW, OF ALBANY, NEW YORK.

ENTRAINMENT MECHANISM.

Application filed October 8, 1924. Serial No. 742,490.

This invention relates to an improved entrainment mechanism and has for its primary object to provide simple and positively operating means for entraining spaced disengaged driving and driven members with each other which is essentially characterized by the fact that said means for effecting such entrainment is operatively controlled and actuated by the driving member to establish and constantly maintain during the operation of said member, an uninterrupted transmission of power from the driving member to the driven member.

More particularly, in a practical embodiment of the invention I provide a power transmission element which is normally idle and an eccentric means actuated from the driving or power member in the initial operation thereof for moving said element from its normally idle position to a position in power transmitting relation with said driving member and a driven member. It is also an important object of my present improvements to provide such an automatic means governed from the driving shaft for effecting an entrainment and to so mount and arrange the power transmitting element that immediately upon discontinuing the application of power to the driving shaft, said power transmitting element is automatically returned to its normal idle position out of operative relation to the driven member.

My present improvements are more particularly designed for use and application in connection with auxiliary propulsion units or boosters for locomotives, but is susceptible of adaptation to numerous other analogous uses, the fundamental purpose being to provide such an automatic entraining means for the propulsion unit which is altogether independent of the steam supply means for such propulsion unit, or other controlling or regulating devices for such propulsion unit or for the main engine of the locomotive.

With the above and other objects in view, the invention consists in the improved entrainment mechanism, and in the form, construction and arrangement of its several parts as will be hereinafter more fully described, illustrated in the accompanying drawings and subsequently incorporated in the subjoined claims.

In the drawings wherein I have illustrated several simple and practical embodiments of my present improvements and in which similar reference characters designate corresponding parts throughout the several views:

Figure 1 is a plan view showing a portion of the supporting frame of a propulsion unit, one of the truck axles or shafts, and my improved entrainment mechanism in one of its practical embodiments;

Figure 2 is a longitudinal section through the end of the frame and the gear housing, showing the entrainment means in full lines in normal position and illustrating the power transmitting gear in dotted lines in entrained relation with the gear on the truck axle or shaft;

Figure 3:
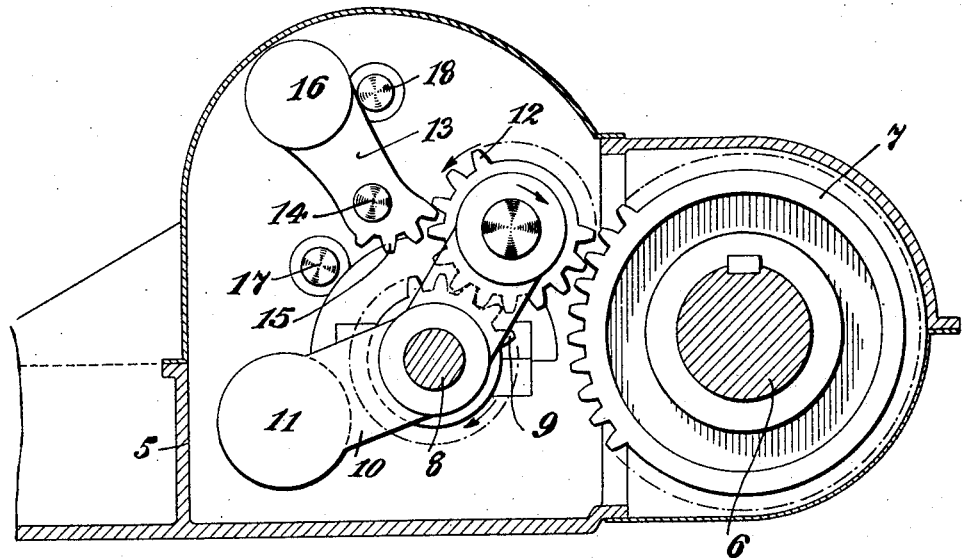
Figure 3 is a view similar to Figure 2 illustrating an intermediate position of the parts before full entrainment takes place.

As heretofore stated, the present invention is primarily designed for the purpose of entraining an auxiliary propulsion unit or booster motor for a locomotive with a normally idle truck axle or shaft, whereby the tractive effort of the main locomotive engine may be supplemented at low speeds. It is, of course, also important that when the aid of this booster motor or propulsion unit is no longer desired or necessary, that it shall be automatically disentrained from the truck axle. However, as will appear from the following description, the present invention is not necessarily restricted to this particular application thereof, but may be readily applied in various other cases to automatically entrain and disentrain a power actuated driving shaft with or from a shaft to be driven thereby.

As illustrated in the accompanying drawings, I have shown a portion of a suitably constructed frame 5 upon which the parts of the auxiliary propulsion unit or booster motor (not shown) are mounted. Any preferred means may be employed for supporting or suspending this motor carrying frame with relation to a truck frame, but I preferably suspend the propulsion unit with its frame between spaced wheel axles of the truck, one of which I have indicated at 6.

This axle which normally runs idle, has fixed thereon a gear wheel 7.

The driving shaft 8 actuated through the medium of suitable connections with the propulsion unit or booster motor is journaled in spaced bearings on the frame 5, and this shaft has fixed thereon the driving gear 9 spaced from and out of meshing relation to the gear 7 on the shaft or axle 6.

Upon the driving shaft 8 there is loosely mounted a rocker member. In the present instance I have shown this rocker member in the form of a yoke having spaced arms 10 arranged respectively on opposite sides of the gear 9 and engaged intermediate of their ends upon the shaft 8 for free rocking movement. The ends of these arms projecting below the shaft 8 are integrally or otherwise connected with each other by a counterbalancing weight 11. The other end portions of said arms are angularly disposed with relation to the weighted ends thereof and extended above the shaft 8. Between the latter ends of the yoke arms the idler gear 12 is rotatably mounted, the teeth of said gear being in constant mesh with the teeth of the driving gear 9.

Above the shaft 8 an arm 13 is pivotally mounted at one of its ends for swinging movement upon a stud or pin 14 fixed in a part of the frame 5. This end of said arm is formed with a series of teeth 15 extending in an arc eccentric with relation to the pivot pin 14. The other end of the arm 13 is provided with a suitable weight 16 which holds said arm in a normal position with its lower edge in contact with a stop 17 fixed to the frame 5. Swinging movement of the arm 13 from such normal position is limited by a second stop 18 on the frame 5.

The gearing above referred to is enclosed within a suitable housing or casing 19 adapted to contain a suitable lubricating oil whereby all of the parts will be automatically lubricated.

From reference to Figure 2 of the drawings, it will be observed that normally, or when the propulsion unit or booster motor is not in operation and the axle 6 is running idle, the arm 13 is in its normal position of rest in engagement with the stop 17 and the teeth of the idler gear 12 are engaged with the eccentric series of teeth 15 on the pivoted end of said arm. Upon supplying steam or other motive agent to the propulsion unit whereby the latter is actuated, rotation is imparted to the driving shaft 8, and through the medium of the gear 9 rotating in a clockwise direction, rotation is transmitted to the idler gear or power transmitting element 12 in an anti-clockwise direction. Since the teeth of this gear are in mesh with the teeth 15 on the lever 13, said lever will be swung upwardly from its normal position, and due to the eccentric relation of the teeth 15 to the lever pivot, it is obvious that the gear 12 will be forced to the right from the position seen in Figure 2, the rocker member in which said gear is mounted rocking freely on the driving shaft 8. Before the teeth of the idler or power transmission gear 12 are thus brought into full meshing relation with the teeth of the gear 7, the arm 13 strikes stop pin 18. This position of the parts is illustrated in Figure 3 of the drawings wherein it will be noted, that one of the teeth of the gear 12 is still in contact with the outer side of the tooth 15 on the pivoted arm which is most remote from the axis of said arm. In the continued rotation of the gear 12, as said tooth slides off of the tooth 15, a camming action takes place and the gear 12 is moved into full meshing relation with the gear 7, as shown in dotted lines in Fig. 2 so that a positive driving impulse is transmitted to the axle 6 from the driving shaft 8. The arm 13 then returns to its normal position. Since this entraining action takes place in the initial rotation of the driving shaft 8 and before the propulsion unit has attained its maximum power output, at the time the teeth of the power transmitting gear 12 are moved into intermeshing or entrained relation with the teeth of the gear 7, said gear 12 is rotating at approximately the same speed as the gear 7 on axle 6, assuming, of course, that the main locomotive engine has been started and the train is moving at slow speed.

Immediately upon effecting such entrainment, the tractive power output of the main engine is supplemented by the auxiliary propulsion unit or booster motor transmitting a positive power driving impulse to the normally idle truck axle 6 whereby the movement of the train will be appreciably accelerated. When the movement of the train has reached a speed of 15 miles per hour and the aid of the auxiliary propulsion unit is no longer desired or necessary, the supply of the steam or other motive agent to said unit is cut off, thereby discontinuing the further rotation of the driving shaft 8. Accordingly, it will be obvious that as the gear 7 on the axle 6 continues to rotate, it will rotate the power transmitting gear 12 on its axis and as said gear is in meshing relation with the now stationary gear 9 on the driving shaft 8, the gear 12 will track around the gear 8 and move to the left from its entrained position, such movement of the gear 12 out of meshing relation with the gear 7 being accelerated by the gravity movement of the weight 11. This movement continues until the teeth of the gear 12 again mesh with the eccentric series of teeth 15 on the pivoted arm 13 which, of course, is in its normal position shown in Figure 2 of the drawings. Thus the disentrainment of the driving shaft from the shaft or axle 6 is also instantaneously automatic when the booster or propulsion unit is cut out.

From the above it will be seen that the entrainment of the driving shaft with the driven shaft or axle and its disentrainment therefrom is brought about solely through the action of mechanical forces, and entirely independent of the direct action of steam or motive agent for the propulsion unit, compressed air or other fluid actuating medium as heretofore employed. After entrainment has been effected by the eccentric action of the arm 13, the power transmitting gear element 12 retains its position in intermeshing relation between the gear 9 and the gear 7 by reason of the driving frictional coaction of the gear teeth which overcomes the gravity action of the weight 11 tending to return the gear element 12 to its normal idle position. However, as soon as the positive rotation of the gear element 12 is stopped or interrupted, said gear element is instantly returned to its normally idle or disentrained position in the manner above explained. It is thus apparent that I have succeeded, in a very simple arrangement of parts, in producing an automatic entraining and disentraining mechanism which will be highly positive and efficient in the performance of its functions.

Figure 4:
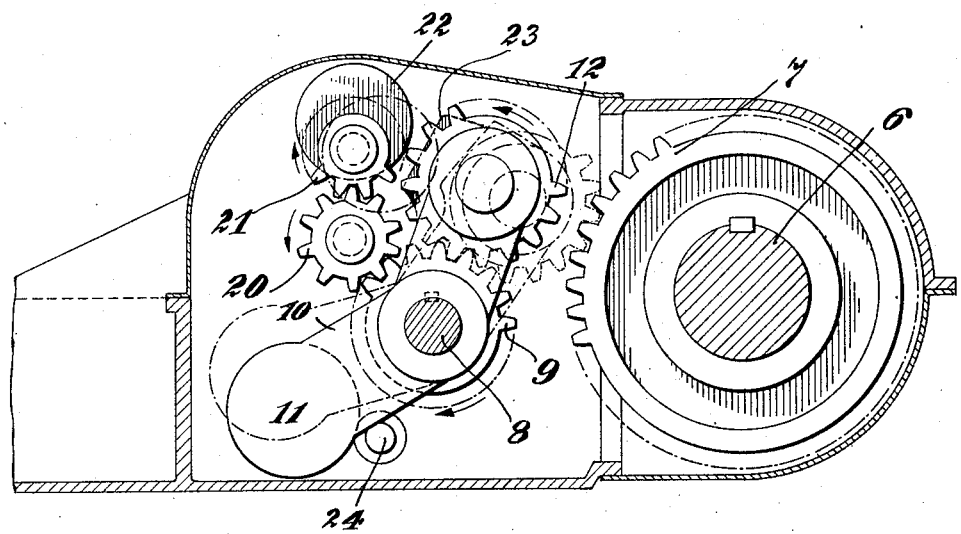
Figure 4 is a sectional view similar to Figure 2 illustrating a slightly modified form of the invention.

In Figure 4 of the drawings I have illustrated an alternative embodiment of the invention wherein the driving, driven and power transmission gears are mounted and arranged substantially in the same manner as above described. In this construction, however, instead of providing the pivoted arm 13, a pinion 20 is suitably mounted upon the supporting frame and transmits rotation from the driving gear 7 to a second pinion 21. This latter pinion carries an eccentric 22 having a smooth or uninterrupted peripheral face which is adapted to coact with an abutment surface 23 on the upper end of one of the yoke arms in which the power transmitting gear 12 is mounted. In this case, downward gravity movement of the other end of the yoke or rocker is limited by the stop pin 24.

In the operation of this embodiment of the invention, the idler or power transmitting gear 12 is normally retained by the weighted rocker out of meshing engagement with the gear 7 on the driven shaft or axle and also out of meshing relation with the pinions 20 and 21. When the propulsion unit is started and the driving shaft 8 rotated, rotation is transmitted through the pinions 20 and 21 to the eccentric 22 simultaneously with the rotation of the idler gear 12. The peripheral face of the eccentric is thus brought into engagement with the abutment face 23 on the rocker member and said rocker is swung upon the driving shaft to move the idler gear 12 carried thereby to the right and into entrained or meshing engagement with the gear 7 on the driven shaft or axle. As this gear moves into its full meshed or entrained position, in the final portion of the enmeshing action, the rocker member is moved upon the driving shaft independently of the eccentric 22 so that the face 23 of said rocker member will be out of contact with the peripheral face of the eccentric in the continued rotation of the latter. This enmeshed or entrained relation of the gears 7 and 12 will be maintained as long as there is a driving power transmitting impulse by the shaft 8. Upon stopping the operation of the booster motor or propulsion unit and consequently, the shaft 8, the idler or power transmitting gear 12 is returned to its normal position in the manner above explained. Should the high portion of the eccentric 22 be opposed to the face 23 of the rocker member at this time there will be sufficient continued rotation of the eccentric 22 transmitted from the gear 7 on the rotating shaft or axle 6 through the gear 12 to permit of such return movement of the rocker member and the idler gear to normal position.

From the foregoing description considered in connection with the accompanying drawings, the construction and arrangement of the several parts, as well as the manner of operation of the illustrated embodiments of the invention will be clearly understood. It will be seen that in each instance, I effect an entrainment between the spaced disengaged driving and driven members through the medium of means which is operatively controlled and actuated by the driving member and which, during the operation of the driving member, constantly maintains an uninterrupted transmission of power from the driving member to the driven member. At the same time, the several parts of this automatic entraining mechanism are so constructed, mounted and arranged that upon the removal of the application of power to the driving shaft, the automatic disentraining of said shaft from the driven shaft results. In so far as I am aware, I believe it to be broadly new in the art to provide means for automatically entraining the normally disentraining driving and driven shafts with each other through the medium of gearing or equivalent power transmitting elements and wherein the actuating or controlling force to establish the entrained relation of such elements is exerted by one of the power transmitting elements, in the operation thereof. Thus it will be seen that a device of this nature is of great practical importance, especially in connection with the operation of auxiliary propulsion units or booster motors for locomotives as I am enabled thereby to entirely dispense with the use of more or less complicated arrangements of piping and control valves such as have heretofore been proposed for this purpose. It will be noted that I avoid the use of springs or other mechanical elements which might be easily broken or become damaged or displaced through shock or vibration so that the device will be at all times positive and reliable in the performance of its functions and will require inspection for purposes of repair only at infrequent intervals.

I have herein described and illustrated several practical and satisfactory embodiments of my present improvements, but no unnecessary limitations are to be implied therefrom since manifestly it may be possible to secure substantially the same desirable results by resorting to other or alternative arrangements of the several elements which may or may not require variations in the form and construction thereof. Accordingly, it is to be understood that I reserve the privilege of adopting all such legitimate modifications of the several embodiments of my invention herein exemplified except as the same might otherwise be restricted or limited by the appended claims.

I claim:

1. In combination with spaced disengaged driving and driven gear members, a power transmitting gear member constantly engaged with the driving gear member, and a member rotatably mounted on a fixed axis and having a surface of varying radius with reference to said axis for coacting with the teeth of the power transmitting gear member and rendered operative thereby in the initial operation of the driving gear member to shift said power transmitting gear member from a normally idle position to a position in power transmitting relation with said driven gear member.

2. In combination with spaced disengaged driving and driven members, a rocker member, a normally idle power transmitting element carried by said rocker member, means controlled and actuated by the driving member in the initial operation thereof to rock said rocker member in one direction and move said power transmitting element from its normally idle position to a position in power transmitting relation with said driving and driven members, said means including a member rotatably mounted on a fixed axis and having a surface of increasing radius with reference to said axis which normally engages said idle power transmitting element and means automatically operating upon the removal of the driving force from said driving member to rock said rocker member in the reverse direction and return said power transmitting element to its normal idle position.

3. In combination with driving and driven shafts and a gear fixed on each of said shafts, a rocker member mounted on the driving shaft, a power transmitting gear carried by said rocker member and constantly engaged with the gear on said driving shaft and normally disengaged from the gear on the driven shaft, a pivoted member having a series of teeth in eccentric relation to its pivot coacting with the teeth of said power transmitting element, said pivoted member being actuated in the initial operation of the driving shaft to impart a planetary movement to the power transmitting element and move the same into entrained relation with the gear on the driven shaft.

4. In combination with driving and driven shafts and a gear fixed on each of said shafts, a rocker member mounted on the driving shaft, a power transmitting gear carried by said rocker member and constantly engaged with the gear on said driving shaft and normally disengaged from the gear on the driven shaft, a pivoted member having a series of teeth in eccentric relation to its pivot coacting with the teeth of said power transmitting element, said pivoted member being actuated in the initial operation of the driving shaft to impart a planetary movement to the power transmitting element and move the same into entrained relation with the gear on the driven shaft, means for subsequently returning said pivoted element to a normal position, and means automatically operating upon removal of the driving force from said driving shaft to restore said rocker member and the power transmitting element to normal position and thereby disentrain said driving and driven shafts.

5. The combination with spaced and disengaged driving and driven toothed gear members, a stationary member, rocker mechanism including a rocker member and a power transmitting gear member carried thereby and having teeth constantly meshing with the teeth of the driving gear member, and eccentric means rotatably mounted on said stationary member having a portion of variable radius for engagement with said rocker mechanism for causing the latter to move toward the driven gear upon initial actuation of the driving gear.

6. The combination with spaced disengaged driving and driven toothed gear members, an intermediate toothed gear member constantly meshing with the driving gear member and movable to meshed and unmeshed positions with respect to the driven gear member, a bearing member stationary with respect to the driving and driven gear members and means eccentrically mounted on said bearing member cooperating with teeth of the intermediate gear member to cause the latter to move toward the driven gear member upon initial actuation of the driving gear member.

7. The combination with spaced disengaged driving and driven gear members, an intermediate gear member constantly meshing with the driving gear member and movable in an arcuate path, having for its axis the axis of the driving gear member, into meshed and unmeshed positions with respect to the driven gear member, a bearing member stationary with respect to the driving and driven gear members and a member capable of rolling engagement with the intermediate gear member as the latter moves in a meshing direction mounted on said bearing and its surface of said engagement disposed eccentrically with respect to the axis of said bearing, whereby, when rotation of the driving gear is initiated, the intermediate gear member will be caused to move in a meshing direction.

In testimony that I claim the foregoing as my invention, I have signed my name hereto.

JOHN A. McGREW.